United States Patent
Wolf et al.

[11] Patent Number: 6,134,572
[45] Date of Patent: Oct. 17, 2000

[54] GALOIS FIELD ARITHMETIC APPARATUS AND METHOD

[75] Inventors: Tod D. Wolf, Richardson, Tex.; William J. Ebel, Starkville, Miss.

[73] Assignee: Texas Instruments Incorporated, Dallas, Tex.

[21] Appl. No.: 09/163,610

[22] Filed: Sep. 30, 1998

Related U.S. Application Data

[60] Provisional application No. 60/060,211, Sep. 30, 1997.

[51] Int. Cl.[7] .................................................. G06F 7/00
[52] U.S. Cl. .............................................................. 708/492
[58] Field of Search ................................. 708/491, 492, 708/517

[56] References Cited

U.S. PATENT DOCUMENTS

| | | | |
|---|---|---|---|
| 4,742,479 | 5/1988 | Kloker et al. ........................... | 708/491 |
| 4,866,654 | 9/1989 | Yamada ................................... | 708/492 |
| 4,918,638 | 4/1990 | Matsumoto et al. ..................... | 708/492 |
| 5,905,665 | 5/1999 | Rim ......................................... | 708/491 |
| 6,038,581 | 3/2000 | Aoki et al. ............................... | 708/492 |

*Primary Examiner*—Chuong Dinh Ngo
*Attorney, Agent, or Firm*—Warren L. Franz; Wade James Brady III; Frederick J. Telecky, Jr.

[57] ABSTRACT

The present invention represents Galois Field elements using power representation, rather than polynomial representation. Such representation eliminates the need for logarithm operations. It provides a simplified decoder and reduced critical path. Utilizing power notation to present field elements, the inventive implementation with modest support circuitry. Addition is more complicated but has a shorter critical path than the multiplication circuit for the polynomial filed element presentation.

1 Claim, 2 Drawing Sheets

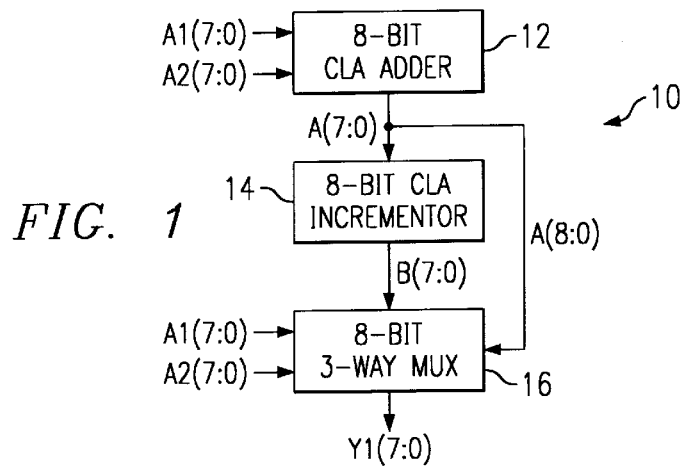
FIG. 1
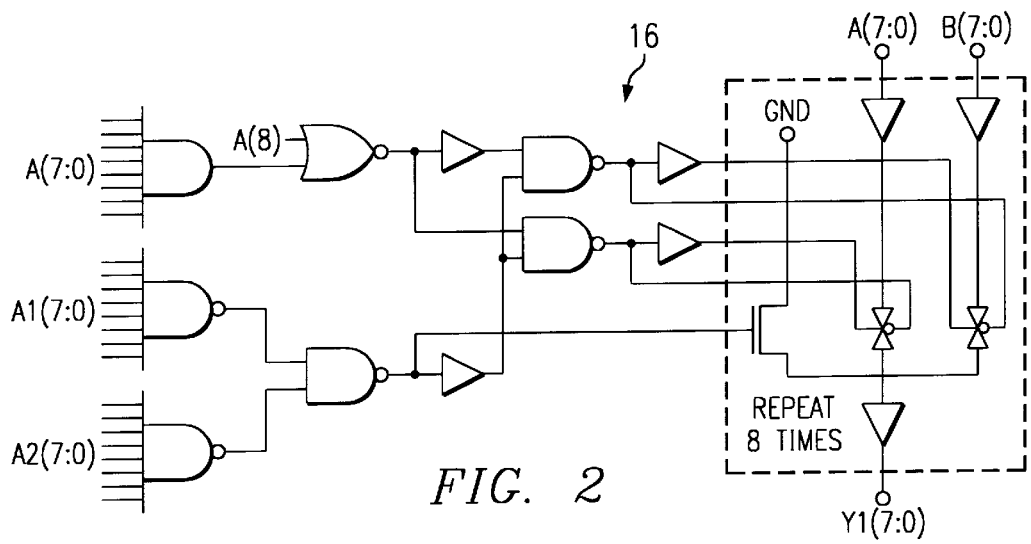
FIG. 2
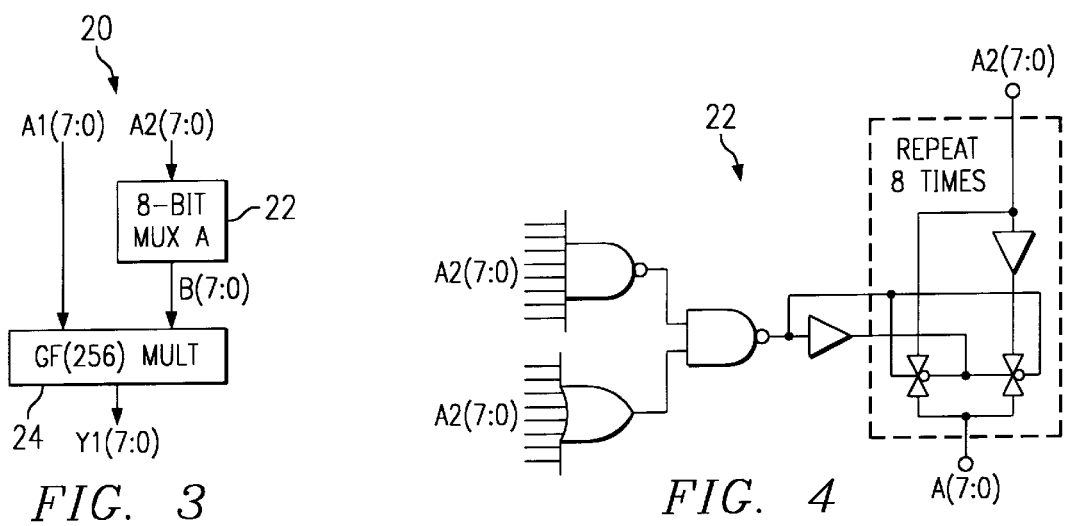
FIG. 3
FIG. 4

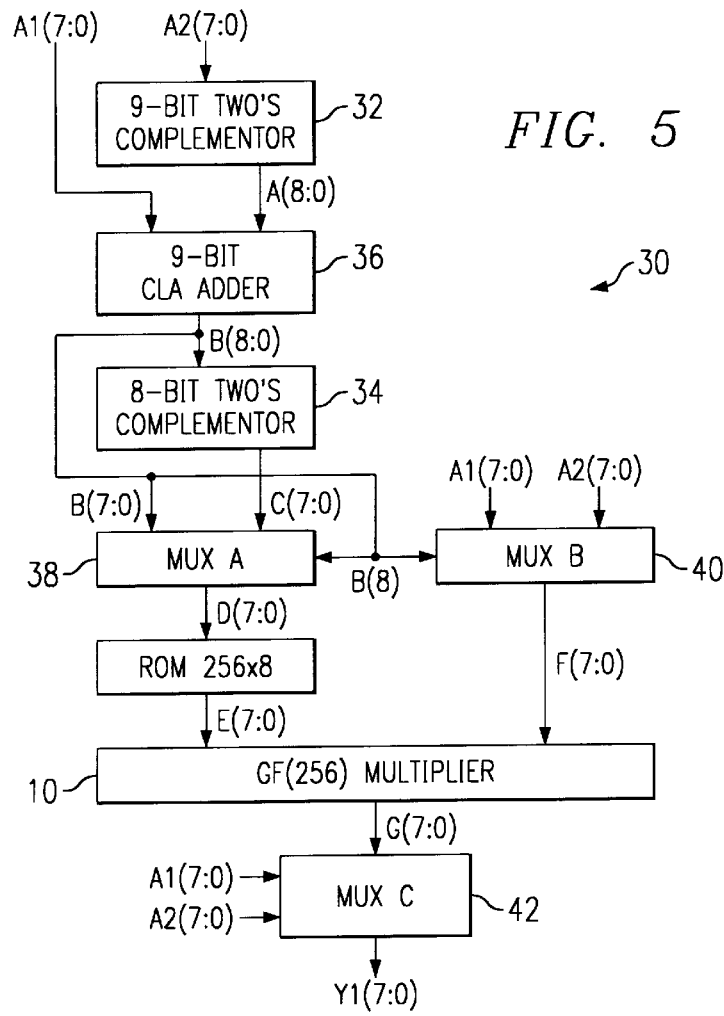
FIG. 5
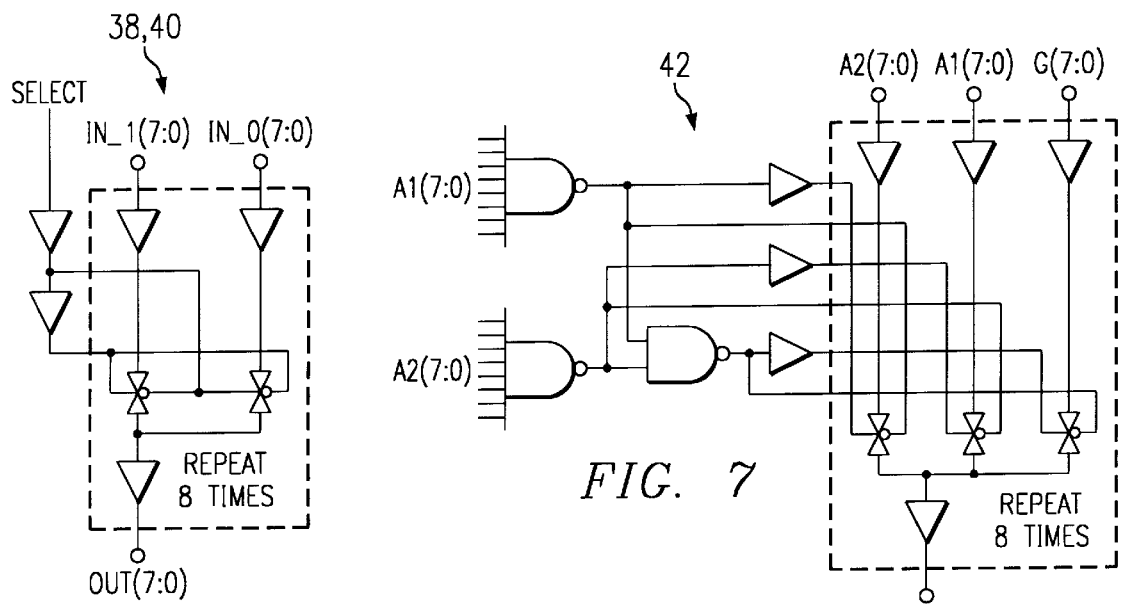
FIG. 6
FIG. 7

GALOIS FIELD ARITHMETIC APPARATUS AND METHOD

This application claims priority under 35 USC 119(e)(1) of provisional application Ser. No. 60/060,211 filed Sep. 30, 1997.

TECHNICAL FIELD OF THE INVENTION

This invention relates to methods and apparatus for implementation of Galois Field arithmetic operations, especially useful for error correction in digital data transmission.

BACKGROUND OF THE INVENTION

Galois Field (GF)256 arithmetic is used in various error correcting codes including Reed-Solomon codes. Reed-Solomon codes are useful in many commercial applications such as remote access modems, compact disks and high definition television. An efficient implementation of the GF 256 arithmetic that improves the performance or lowers the cost of an integrated circuit is beneficial. Moreover, with the ever increasing demand for high-speed communication systems, reducing the critical path of an error correcting decoder is critical.

In conventional systems, GF arithmetic is implemented using polynomial representations for the field elements. This makes GF addition simple but requires complex multiplication circuits which require many clock cycles per multiply. Furthermore, the decoder requires that logarithms in the Galois Field be performed. This requires a table look-up operation or a circuit which needs many clock cycles to complete.

Prior art implementations of GF arithmetic are given in U.S. Pat. Nos. 4,037,093, 4,251,875, 4,473,887, 4,852,098, 4,918,638, 4,975,867, 5,502,665 all of which are incorporated herein by reference.

SUMMARY OF THE INVENTION

The invention provides a method for implementing Galois Field arithmetic which collectively reduces the critical path for GF multiplication and addition.

The invention represents Galois Field elements using power representation, rather than polynomial representation. Such representation eliminates the need for logarithm operations. It provides a simplified decoder and reduced critical path. Utilizing power notation to represent field elements, the inventive implementation enables GF multiplication to be reduced to ordinary integer addition with modest support circuitry. Addition is more complicated but has a shorter critical path than the multiplication circuit for the polynomial field element representation.

BRIEF DESCRIPTION OF THE DRAWINGS

FIG. 1 is a block diagram of a GF(256) multiplier embodiment in accordance with the invention;

FIG. 2 shows an implementation of the three-way MUX block of FIG. 1;

FIG. 3 is a block diagram of a GF(256) divider embodiment in accordance with the invention;

FIG. 4 shows an implementation of the MUX A block of FIG. 3;

FIG. 5 is a block diagram of a GF(256) adder embodiment in accordance with the invention;

FIG. 6 shows an implementation of the MUX A and MUX B blocks of FIG. 5; and

FIG. 7 shows an implementation for the MUX C block of FIG. 5.

BRIEF DESCRIPTION OF THE PREFERRED EMBODIMENTS

In GF(256) arithmetic, multiplication of two non-zero elements $\alpha^i$ and $\alpha^j$, which are represented by the integers i and j, can be expressed as $(i+j)_{255}$, where $(\ldots)_{255}$ denotes the modulus of the argument with respect to 255. Any field element multiplied by zero (integer 255) must be zero. Therefore, if a and b are the integer representations of two field elements in GF(256), then the GF(256) multiplication operation is given by $$a \times b = (a+b)_{255}, \text{ if } a, b \neq 255; \quad (1)$$
$$255, \text{ if } a = 255 \text{ or } b = 255.$$

This only requires an ordinary integer addition with an overflow that folds back into the addition operation to account for the modulus operation as well as two compares.

Division is similar except that the integer operation is subtraction. That is, $$a \div b = (a-b)_{255}, \text{ if } a, b \neq 255; \quad (2)$$
$$255, \text{ if } a = 255 \text{ and } b \neq 255;$$
$$\text{Undefined, if } b = 255.$$

Again, this operation requires an ordinary addition with two compares.

Addition is more complicated. Since the integer assignment of each field element has been made rather arbitrarily, no efficient hardware implementation for addition is apparent. Therefore, the approach taken is to write the addition of two non-zero elements as a two step process, as follows:

$$\alpha^i + \alpha^j = \alpha^i(\alpha^0 + \alpha^{j-i}), j > i \quad (3)$$

The addition by the field element $\alpha^0$ is performed with a table look-up operation. The table is shown in Table 1. The complexity of this addition operation involves a comparison to see which argument is larger, an integer subtraction to obtain the exponent, a table look-up, and a GF(256) multiply. The table to be stored consists of 256 bytes.

Subtraction is identical to addition in GF(256). This is because in GF(2) A+B=A−B. Since 2 is the characteristic of the field GF(256), this property of GF(2) applies to GF(256). Therefore, in GF(256), subtraction is identical to addition.

A GF(256) multiplication implementation 10 is shown in FIG. 1. The 8-bit carry look-ahead (CLA) adder 12 and 8-bit CLA incrementor 14 can be found in many computer arithmetic books. See, e.g., Israel Koren, "*Computer Arithmetic Algorithms*," Apprentice Hall, 1993. The 8-bit three-way MUX block 16 is shown in FIG. 2.

A1 and A2 are the inputs and Y1 is the output of the multiplier. All are 8-bit integers with a range from 0 to 255. A1 and A2 are summed together to form A. Next, A is incremented to form B. Because of modulo arithmetic with respect to 255, a subtraction of 255 is equal to the addition of 1. A(8:0) is checked to determine if the sum of A1 and A2 is larger than 254. If A(8:0) is larger than 254, then Y1 will equal B; if not, Y1 will equal A. If A1 or A2 is equal to 255, this will force Y1 to equal 255. This logic is performed in the 8-bit three-way MUX.

This implementation contains 150 gates. The 8-bit CLA adder contains 65 gates. The 8-bit CLA incrementor contains 34 gates. The 8-bit three-way MUX block contains 51 gates. The transmission gate pairs are counted as one gate because in the layout the source drain region of the outputs would be shared. The 8-input AND gate is counted as three gates because it will be implemented as two 4-input NAND gates, and one 2-input NOR gate. The 8-input NAND gates are the same as the 8-input AND gate with an additional inverter on the output.

A GF(256) division implementation 20 is shown in FIG. 3. It is similar to the GF(256) multiplication implementation. A division can be converted into a multiplication by taking the reciprocal of the denominator.

$$\frac{A1}{A2} = (A1)(A2)^{-1} \quad (4)$$

The denominator needs to be checked for 0 and 255. If it is 0 or 255, by convention, B is set equal to A2. If the denominator is not zero, invert A2. Details of the 8-bit MUX A block 22 are shown in FIG. 4. This implementation contains 171 gates. The GF(256) multiplier 24 contains 154 gates and the 8-bit division MUX A contains 25 gates.

8 bits wide. The table look-up is shown in Table 1. The table is stored as a ROM instead of a gate implementation because the ROM implementation contains a fewer number of gates. Signal E is the output of the ROM.

Finally, signals E and F are multiplied together using the GF(256) multiplier. This step is performing the $\alpha^i \alpha^k$ operation. However, if A1 is a zero (integer 255), then this addition method does not work; however, the result is simply A2. Likewise if A2 is a zero. Therefore MUX C passes G if neither A1 nor A2 is a zero. And also the MUX passes A2 if A1 (and/or A2) is a zero and passes A1 if A2 is a zero.

The GF(256) addition model contains 434 gates and one 256×8 ROM. The 9-bit CLA adder contains 74 gates. The 9-bit and 8-bit two's complementor contain 48 and 42 gates, respectively. MUX A and B each contain 34 gates. MUX C contains 52 gates and the GF(256) multiplier contains 150 gates.

TABLE 1

Field Element Additions of $\alpha^0$

| Agr. | Integer representation for the resultant $\alpha^0$ addition | | | | | | | | | | | | | | | |
|---|---|---|---|---|---|---|---|---|---|---|---|---|---|---|---|---|
| 0–15 | 255 | 25 | 50 | 223 | 100 | 138 | 191 | 112 | 200 | 120 | 21 | 245 | 127 | 99 | 224 | 33 |
| 16–31 | 145 | 68 | 240 | 92 | 42 | 10 | 235 | 196 | 254 | 1 | 198 | 104 | 193 | 181 | 66 | 45 |
| 32–47 | 35 | 15 | 136 | 32 | 225 | 179 | 184 | 106 | 84 | 157 | 20 | 121 | 215 | 31 | 137 | 101 |
| 48–63 | 253 | 197 | 2 | 238 | 141 | 147 | 208 | 63 | 131 | 83 | 107 | 82 | 132 | 186 | 90 | 55 |
| 64–79 | 70 | 162 | 30 | 216 | 17 | 130 | 64 | 109 | 195 | 236 | 103 | 199 | 113 | 228 | 212 | 174 |
| 80–95 | 168 | 160 | 59 | 57 | 40 | 170 | 242 | 167 | 175 | 203 | 62 | 209 | 19 | 158 | 202 | 176 |
| 96–111 | 251 | 190 | 139 | 13 | 4 | 47 | 221 | 74 | 27 | 248 | 39 | 58 | 161 | 71 | 126 | 246 |
| 112–127 | 7 | 76 | 166 | 243 | 214 | 122 | 164 | 153 | 9 | 43 | 117 | 183 | 180 | 194 | 110 | 12 |
| 128–143 | 140 | 239 | 69 | 56 | 60 | 250 | 177 | 144 | 34 | 46 | 5 | 98 | 128 | 52 | 218 | 150 |
| 144–159 | 135 | 16 | 217 | 53 | 206 | 188 | 143 | 178 | 226 | 119 | 201 | 159 | 169 | 41 | 93 | 155 |
| 160–175 | 81 | 108 | 65 | 182 | 118 | 227 | 114 | 87 | 80 | 156 | 85 | 211 | 229 | 232 | 79 | 88 |
| 176–191 | 95 | 134 | 151 | 37 | 124 | 29 | 163 | 123 | 38 | 249 | 61 | 204 | 149 | 219 | 97 | 6 |
| 192–207 | 247 | 28 | 125 | 72 | 23 | 49 | 26 | 75 | 8 | 154 | 94 | 89 | 187 | 207 | 148 | 205 |
| 208–223 | 54 | 91 | 241 | 171 | 78 | 233 | 116 | 44 | 67 | 146 | 142 | 189 | 252 | 102 | 237 | 3 |
| 224–239 | 14 | 36 | 152 | 165 | 77 | 172 | 231 | 230 | 173 | 213 | 244 | 22 | 73 | 222 | 51 | 129 |
| 240–255 | 18 | 210 | 86 | 115 | 234 | 11 | 111 | 192 | 105 | 185 | 133 | 96 | 220 | 48 | 24 | 0 |

A GF(256) addition implementation 30 is shown in FIG. 5. The two complementor blocks 32, 34 simply invert the input and increment. The CLA incrementor and CLA adder 36 can be of the conventional type found in many computer arithmetic books. The 8-bit MUX A and B 38, 40 are shown in FIG. 6 and the 8-bit MUX C 42 is shown in FIG. 7.

The inputs A1 and A2 and output Y1 are 8-bit integers. A comparison of A1 and A2 is made in order to determine which operands to supply to the GF(256) multiplier. A2 is inverted and incremented and the result is summed with A1. The result of this operation is signal B. This value is compared with 255. If the result is less than or equal to 255, then A1 must have been larger than A2; therefore D is equal to A1−A2 and F is equal to A2. If the result was greater than 255, then A2 must have been larger than A1; therefore D is equal to A2−A1 and F is equal to A1.

Signal D is applied to the GF(256) Zech's logarithm read-only memory (ROM). The GF(256) Zech's logarithm ROM performs the following operation: $\alpha^0 + \alpha^{j-i} = \alpha^k$, j>i. This ROM contains 256 elements of which each element is Each of the three GF(256) arithmetic functions were simulated in C. The expected results from all $_28 \times _28 = 65536$ permutations were generated in C. Next, a VHDL model was written to match the bit-wise architecture described in FIGS. 1–7. Each function was simulated and the results of the VHDL simulation were compared with the C results. The VHDL output matched the C output exactly.

What is claimed is:

1. A method for implementing Galois Field 256 multiplication of two 8-bit integer inputs A1 and A2 to give an 8-bit integer output Y1, comprising the steps of:

summing first and second inputs A1(7:0) and A2 (7:0) using a carry look-ahead adder to form an output A (8:0);

incrementing A(7:0) using a carry look-ahead incrementor to form an output B(7:0);

checking A(8:0) to determine whether it larger than 254;

if A(8:0) is larger than 254, setting B(7:0) as the output Y1(7:0) of the multiplication; if the output A(8:0) is not larger than 254, setting A(7:0) as the output Y1(7:0).

* * * * *